United States Patent [19]

Stewart et al.

[11] Patent Number: 4,741,196
[45] Date of Patent: May 3, 1988

[54] AIR CONVEYOR AND METHOD FOR REMOVING PARTS FROM A HIGH SPEED FORMING PRESS

[75] Inventors: Harry D. Stewart, Tipp City; Ralph P. Stodd, Dayton, both of Ohio

[73] Assignee: Formatec Tooling Systems, Inc., Dayton, Ohio

[21] Appl. No.: 12,500

[22] Filed: Feb. 9, 1987

[51] Int. Cl.$^4$ .................. B21D 45/02; B21J 13/08
[52] U.S. Cl. ........................... 72/427; 72/361; 72/405; 406/88
[58] Field of Search ............... 72/345, 346, 361, 405, 72/427; 406/86, 87, 88, 108

[56] References Cited

U.S. PATENT DOCUMENTS

| | | | |
|---|---|---|---|
| 3,350,140 | 10/1967 | Strydom | 406/88 |
| 3,947,236 | 3/1976 | Lasch, Jr. | 406/88 |
| 4,454,743 | 6/1984 | Bulso, Jr. et al. | 72/349 |
| 4,483,172 | 11/1984 | Bulso, Jr. et al. | 72/349 |
| 4,554,814 | 11/1985 | Grow et al. | 72/405 |
| 4,696,179 | 9/1987 | Cook et al. | 72/405 |

Primary Examiner—Robert L. Spruill
Assistant Examiner—Donald R. Studebaker
Attorney, Agent, or Firm—Jacox & Meckstroth

[57] ABSTRACT

Successively formed cans or cups are quickly and smoothly removed from beneath the lower die shoe of a high speed forming press by an elongated dual lane stainless steel air conveyor having closely spaced upper and lower parallel walls defining an air chamber therebetween. A blower supplies air to the discharge end portion of the conveyor, and the inner end portion of the conveyor top wall defines two cup receiving zones adjacent corresponding outlets formed by upwardly projecting air deflecting hoods. Each hood directs a high flow of air horizontally across the adjacent receiving zone and longitudinally along the top conveyor wall to move each cup quickly from the receiving zone. Longitudinal extending parallel ribs project upwardly from the top wall for each lane, and a set of louvered slots are formed within the top wall between the ribs to maintain the linear and uniform flow of the cups to the discharge end of the conveyor. A single blower may supply air to a plurality of either single or multiple lane air conveyors.

19 Claims, 1 Drawing Sheet

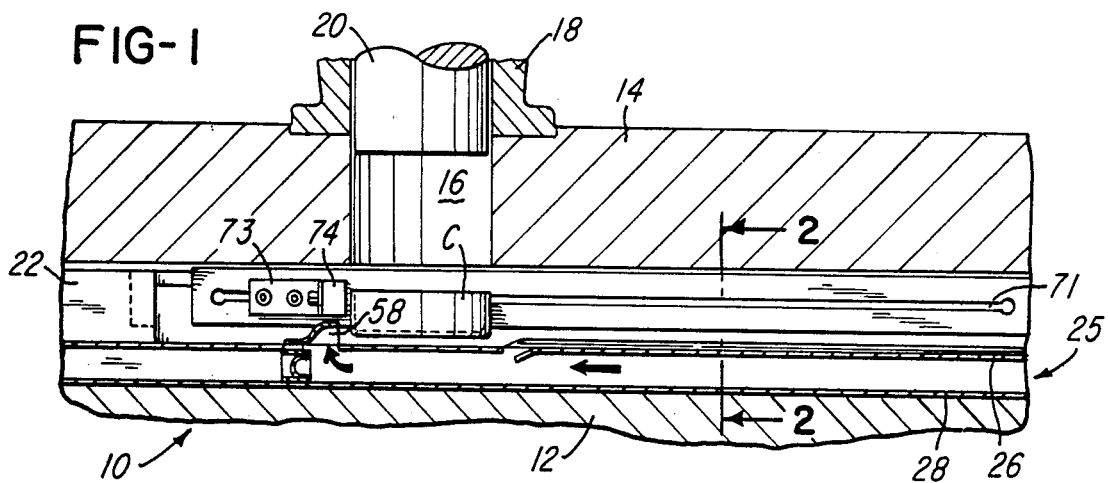
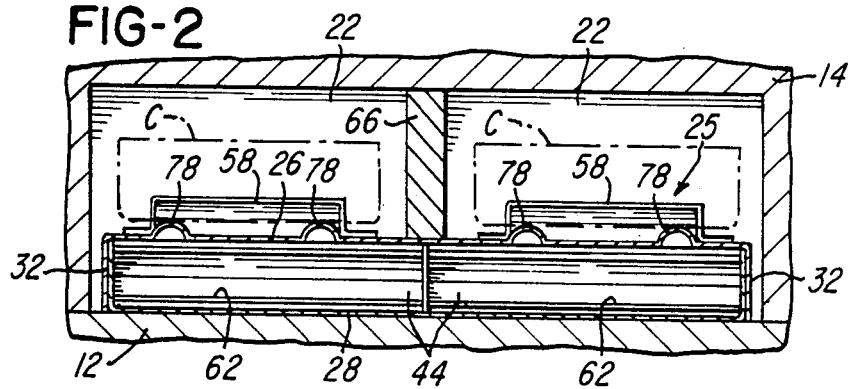
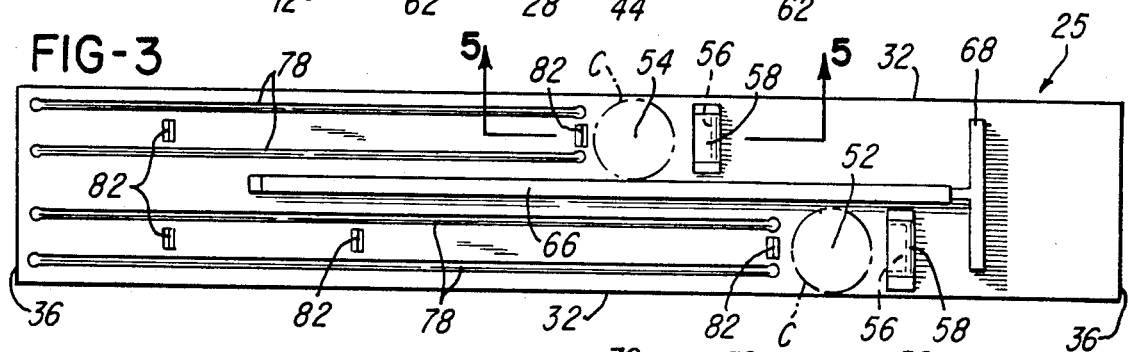
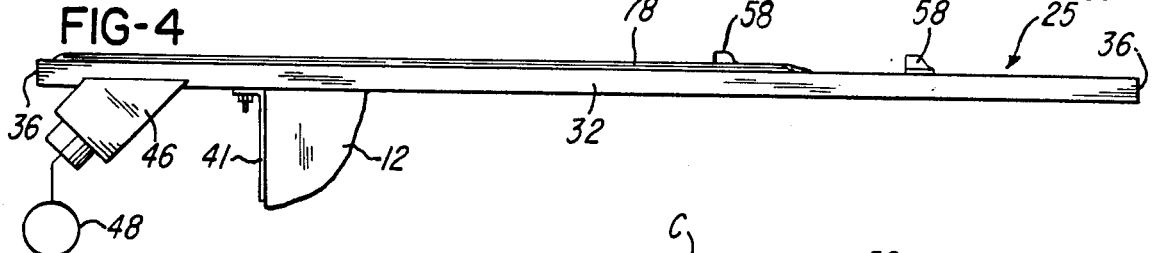
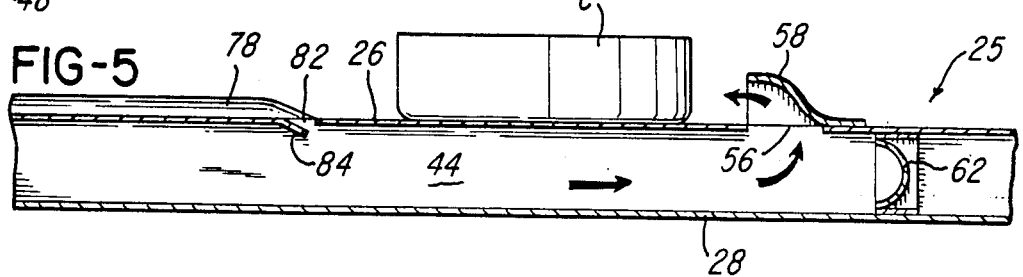

AIR CONVEYOR AND METHOD FOR REMOVING PARTS FROM A HIGH SPEED FORMING PRESS

BACKGROUND OF THE INVENTION

In the high speed production or forming of cans or cups drawn from sheet metal, for example, as disclosed in U.S. Pat. Nos. 4,454,743 and No. 4,483,172, it is common to remove the drawn cups from a space defined between the lower die shoe and the press bed with an endless belt conveyor, as shown in the patents. The belt conveyor extends into a tunnel defined within the lower die shoe, and the discharge end of the conveyor is usually driven by a variable speed drive.

One of the problems encountered with using endless conveyors for removing the cups, is the occasional jamming of a group of cups on the conveyor, especially when attempts are made to operate the press at a higher speed. When the cups jam, it is necessary to stop the press and remove the cup jam. This results in downtime for the press and thus reduces the press operating efficiency. In addition, the endless belt conveyors require periodic maintenance in order to repair or replace worn pulleys, drive shafts, bearings, belts or conveyor gear boxes.

To avoid the above mentioned problems associated with mechanical endless belt conveyors for removing drawn cups from the forming press, a high pressure air jet, discharged from a nozzle connected to an air compressor line, has been used to blast each cup from the cup receiving zone and onto an air flotation platform. The platform is provided with closely spaced small holes through which air flows upwardly from a chamber below to provide air floatation for each cup as it is blasted by the high pressure jet of air from the nozzle. However, it has been found that use of a jet of compressed air at each forming station requires the operation of an air compressor which adds significantly to the cost of operating the press. In addition, the small holes in the air floatation platform will clog with lubricating oil which is discharged with the formed cups, and a drop in air floatation can result in a cup jam and downtime for the press.

SUMMARY OF THE INVENTION

The present invention is directed to an improved pneumatic or air conveyor which solves all of the problems mentioned above and provides for not only reliable and maintenance-free continuous discharge of a series of parts or cups from a press, but also provides for operating the press at a higher speed to obtain more economical production of the parts or cups. Thus the air conveyor of the invention essentially eliminates downtime of the press due to cup jams on the discharge conveyor, eliminates the costly maintenance associated with mechanical conveyors, and eliminates the expense of supplying high pressure air from an air compressor. The conveyor of the invention further provides for a uniform and stabilized flow of the parts or cups from the die set and is effective to create a sufficient suction which helps to pull each cup from its discharge opening in the die shoe and onto the conveyor.

In accordance with one embodiment of the invention, the above advantages and features are generally provided by an elongated dual lane air conveyor formed entirely of stainless steel sheet and having vertically spaced top and bottom parallel walls. The walls define therebetween a chamber which receives a relative high flow rate of low pressure air supplied from a blower connected by a hose to the discharge end portion of the conveyor. The inner end portion of the conveyor defines two flat cup receiving zones, and a hood projects upwardly over an opening or slot formed in the top wall at each receiving zone for directing a high flow rate of air across each receiving zone and longitudinally of the top conveyor wall. A pair of parallel spaced ribs project upwardly from the top wall and extend from each cup receiving zone to the discharge end of the conveyor. A plurality of longitudinally spaced louvered openings or slots are formed within the top wall between each pair of ribs to provide an additional flow of air to assure continuous movement of the cups along the ribs to the discharge end of the conveyor.

Other features and advantages of the invention will be apparent from the following description, the accompanying drawing and the appended claims.

BRIEF DESCRIPTION OF THE DRAWING

FIG. 1 is a fragmentary vertical section through a press bed and a lower die shoe and showing the position of an air conveyor constructed in accordance with the invention;

FIG. 2 is an enlarged fragmentary cross section taken generally on the line 2—2 of FIG. 1;

FIG. 3 is a plan view of the air conveyor shown in FIGS. 1 and 2;

FIG. 4 is a side elevational view of the conveyor shown in FIG. 3; and

FIG. 5 is an enlarged fragmentary section taken generally on the line 5—5 of FIG. 3.

DESCRIPTION OF THE PREFERRED EMBODIMENT

Referring to FIG. 1, a high speed mechanical press 10 includes a press bed 12 which receives and supports a die set including a lower die shoe 14 having a series of cylindrical openings 16 each surrounded by a die ring 18. A punch 20 reciprocates vertically within each die ring 18 for successively forming cylindrical sheet metal cans or cups C which are usually aluminum or coated steel. Each punch 20 extends downwardly by a sufficient distance during its stroke to discharge the cup successively through the hole 16 and into a receiving passage or tunnel 22 formed within the lower die shoe 14. Each punch 20 may reciprocate at a relatively high speed, for example, over 200 strokes per minute and upwards to 300 strokes per minute with one cup C being formed with each stroke.

In accordance with the present invention, an elongated dual lane air conveyor 25 extends within the tunnel 22 and is constructed entirely of stainless steel sheet metal. The conveyor 25 includes a generally flat duct formed by an upper or top wall 26 and a lower or bottom wall 28 which rests on the top surface of the press bed 12. The walls 26 and 28 are connected by opposite side or edge walls 32 and opposite end walls 36. As shown in FIG. 4, an angle bracket 41 is secured to the outer or discharge end portion of the bottom wall 28 and is attached to the press bed 12 to secure the conveyor 25 in position within the tunnel 22.

The parallel top and bottom walls 26 and 28 defined therebetween a longitudinally extending air chamber 44, and the outer end portion of the chamber 44 receives a supply of air through a stainless steel duct 46 (FIG. 4) connected by a hose and manifold (not shown) to a motor driven air blower 48. The flow rate of air through the duct 46 and into the chamber 44 is relatively high, for example, on the order of 230 cubic feet per minute. The pressure of the supply air at the duct 46 is relatively low, for example, on the order of 1.95 inches of water. The blower 48 is capable of supplying air to a number of the dual lane conveyors 25, for example, six or eight such conveyors as may be required on a single mechanical press.

Referring to FIG. 3, the top wall 26 of the conveyor 25 has two cup receiving zones 52 and 54 which are located directly under corresponding holes 16 within the lower die shoe 14. Adjacent to each of the cup receiving zones 52 and 54, the top wall 26 has a rectangular opening or slot 56, and each slot 56 is covered by a deflector hood 58 (FIGS. 3–5) which defines the air discharge outlet. A pair of baffles 62 are located within the chamber 44 adjacent the openings 56 and helped direct the air flowing within the chamber 44 upwardly through the openings 56. The hoods 58 direct the air flow longitudinally of the conveyor 25 across the cup receiving zones 52 and 54 and horizontally towards the discharge end of the conveyor. Preferably, the outlet of each hood 58 has an area of about one square inch or greater to provide for a substantial flow of air from the outlet. The top of each hood 58 is spaced below the top surface defining the tunnel 22 and preferably below the top edge of each cup C so that access to a cup jamb can be obtained from the inner end of the tunnel 22.

As shown in FIG. 2, a divider barrier or bar 66 separates the two lanes on the top wall 26 of the conveyor 25, and the bar 66 is supported on the inner end portion of the conveyor by a block 68 mounted on the top wall 26 of the conveyor 25. The bar 66 has a longitudinally extending slot 71 which receives a set of screws for supporting a pair of longitudinally adjustable angle brackets 73. The brackets 73 support electronic cup sensors 74 (FIG. 1) directly over the corresponding hoods 58.

The top wall 26 of the conveyor 25 is deformed to form a pair of longitudinally extending ribs 78 for each of the cup transfer lanes. The leading sloping ends of each pair of ribs 78 start immediately downstream of the corresponding cup receiving zone 52 or 54. As also shown in FIG. 3, a series of rectangular louvered openings or slots 82 are formed within the top wall 26 between each pair of ribs 78 and at longitudinally spaced intervals. A lanced tab or flange 84 projects downwardly from each of the slots 82 into the chamber 44 at an angle of about 25° with the top wall 26.

In operation of the dual lane air conveyor 25, the cups C are successively deposited on each of the cup receiving zones 52 at a rate, for example, of 200–300 cups per minute as mentioned above. As each cup drops downwardly to the flat top surface of its cup receiving zone, the volume flow of air from the adjacent hood 58 immediately moves or transfers the cup outwardly toward the discharge end of the conveyor and onto the adjacent pair of ribs 78. The auxilliary air flowing through the louvered openings or slots 82 helps maintain the outward flow of the cups along the ribs 78 until the cups are transferred from the discharge end of the conveyor 25 onto another cup transfer conveyor (not shown). The relatively high flow rate of air from the hoods 58 through the tunnel 22 also produces a venturi action or reduced pressure under each die opening 16 so that each cup C tends to be sucked out of its corresponding opening 16 and into the stream of air flowing outwardly above the ribs 78 on the top conveyor wall 26. This assures that each cup C is quickly removed from its cup receiving zone 52 or 54 to make room for the next successive cup.

From the drawing of the above description, it is apparent that an air conveyor constructed in accordance with the present invention, provides desirable features and advantages. As one primary advantage, the conveyor 25 provides for a dependable high speed removal of the cups from the press so that the press may be operated at a higher speed and with less down-time caused by cup jams. Since the conveyor 25 has no moving parts, all wearing parts and maintenance parts and items have been eliminated. In addition, the conveyor 25 uses only air supplied from the blower 48 and thus does not use significantly more costly high pressure air from a line connected to an air compressor. It has also been found that the relatively large openings or slots 56 and 82 are not clogged by the oil which flows with and drains from the cups C, and the ribs 78 tend to channel the flow of oil outwardly towards the discharge end of the conveyor where the oil is collected. Preferably, the total area of the hood outlets and the slots 82 does not exceed 50% of the lateral cross-sectional area of the chamber 44 as shown in FIG. 2 to provide for efficient use of the air from the blower 48.

While the internal baffles 62 are not essential, the baffles tend to cooperate with the hoods 58 to reverse the flow of air which is supplied to the discharge end portion of the conveyor 25 and is discharged with the flow of cups from the same end portion. Preferably, the ribs 78 do not extend into the cup receiving zone 52 or 54 so that the cups do not receive marks from the ribs when the cups are deposited out of the die openings 16 and onto the conveyor 25. On the other hand, the ribs 78 cooperate with the flow of air from the slots 56 and 82 to limit and control frictional drag on each cup and especially with the oil film on each cup. Furthermore, while a dual lane conveyor 25 is described above in connection with the drawing, it is apparent that conveyor may be made as a single lane conveyor or may have additional lanes, depending upon the construction of the die set within the press. The blower 48 may also be used to supply several dual lane conveyors 25, for example, about seven dual lane conveyors 25 or fifteen single lane conveyors. As mentioned above, the complete stainless steel construction of the conveyor 25 also provides the conveyor with a long and continuous surface life without any problem of the lubricating oil attacking the conveyor to cause rust or material softening or breakdown. The outer end portion of the conveyor may also have a top wall section which slopes downwardly towards the outer end for accommodating existing cup transfer tables.

While the form of conveyor apparatus herein described and its method of use, constitute a preferred embodiment of the invention, it is to be understood that the invention is not limited to the precise form of apparatus method described, and that changes may be made therein without departing from the scope and spirit of the invention as defined in the appended claims.

The invention having thus been described, the following is claimed:

1. An air conveyor adapted for use in a space defined between the bed of a mechanical press and a lower die shoe mounted on the press for rapidly and dependably removing a succession of articles such as cups being formed in the press, said conveyor comprising an elongated generally flat duct having vertically spaced and generally parallel top and bottom walls and defining a longitudinally extending air chamber, said duct having a discharge end portion, means defining an air supply inlet for said chamber within said discharge end portion, an air blower having an outlet connected to said inlet, said top wall of said duct having an article receiving portion where the articles are successively deposited on said top wall, and air directing means projecting upwardly from said top wall adjacent said article receiving portion and defining an outlet positioned to direct a flow of air longitudinally above said top wall towards said discharge end portion for immediately moving each article from said article receiving portion and longitudinally along said top wall.

2. A conveyor as defined in claim 1 and including means defining a plurality of louvered openings within said top wall of said duct downstream of said air directing means for directing a flow of air upwardly from said chamber and towards said discharge end portion of said duct to provide for controlled longitudinal movement of each article along said top wall, and the combined areas of said outlet and said openings being less than one-half the cross-sectional area of said chamber.

3. A conveyor as defined in claim 1 and including means forming a plurality of longitudinally extending and upwardly projecting parallel spaced ribs on said top wall of said duct to control frictional drag between the articles and said top wall of said duct especially when the articles carry a lubricating oil.

4. A conveyor as defined in claim 3 wherein said article receiving portion of said top wall is substantially flat and is defined between said air directing means and leading end portions of said ribs.

5. A conveyor as defined in claim 3 and including means defining at least one louvered opening within said top wall of said duct between said ribs to provide for controlled longitudinal movement of each article along said ribs.

6. A conveyor as defined in claim 5 wherein said louvered opening is defined by a tab portion of said top wall, and said tab portion projects downwardly into said chamber at an acute angle relative to said top wall.

7. A conveyor as defined in claim 1 wherein said duct is formed of sheet metal, and at least one louvered opening formed within said top wall downstream of said air directing means by a tab portion projecting downwardly from said top wall into said chamber at an acute angle relative to said top wall to produce a combined upward flow of air from said chamber and downstream along said top wall towards said discharge end portion.

8. A conveyor as defined in claim 1 wherein said air directing means and said outlet are disposed within an inner end portion of said duct, and said air supply opening is disposed within said bottom wall of said discharge end portion of said duct.

9. A conveyor as defined in claim 1 wherein said air directing means comprise a hood member, and said hood member has an upper surface spaced below the die shoe by a sufficient distance to provide for access to the cups with a probe extending above said hood member.

10. An air conveyer adapted for use in a space defined between the bed of a mechanical press and a lower die shoe mounted on the press for rapidly and dependably removing a succession of articles such as cups being formed in the press, said conveyer comprising an elongated generally flat sheet metal duct having vertically spaced and generally parallel top and bottom walls and defining a longitudinally extending air chamber, said duct having an inner end portion and a discharge end portion, means defining an air supply inlet for said chamber within said discharge end portion of said duct, an air blower having an outlet connected to said inlet, said inner end portion of said top wall having an article receiving portion where the articles are successively deposited on said top wall, hood means projecting above said top wall and defining an air outlet positioned to direct a substantial flow of air across said article receiving portion and longitudinally above said top wall for immediately moving each article from said article receiving portion and longitudinally along said top wall, and means on said top wall for controlling frictional drag between the articles and said top wall of said duct especially when the articles carry a lubricating oil.

11. A conveyor as defined in claim 10 wherein said means for controlling frictional drag comprise a plurality of longitudinally extending and upwardly projecting parallel spaced ribs on said top wall, and means defining at least one louvered opening within said top wall of said duct downstream of said hood means for directing a flow of air upwardly from said chamber and towards said discharge end portion of said conveyor to provide for continuous longitudinal movement of each article along said top wall.

12. A conveyor as defined in claim 11 wherein said article receiving portion of said top wall is substantially flat and is defined between said hood means and leading end portions of said ribs.

13. A conveyor as defined in claim 11 wherein said louvered opening is defined by a tab portion of said top wall, and said tab portion projects downwardly into said chamber at an acute angle relative to said top wall.

14. A conveyor as defined in claim 10 wherein said top wall of said duct forms two parallel article transfer lanes each including said hood means, and divider means extending longitudinally above said top wall and between said lanes.

15. An air conveyer adapted for use in a space defined between the bed of a mechanical press and a lower die shoe mounted on the press for rapidly and dependably removing a succession of metal cups formed in the press, said conveyer comprising an elonated generally flat sheet metal duct having vertically spaced and generally parallel top and bottom walls and defining a longitudinally extending air chamber, said duct having an inner end portion adapted to be located within the press and a discharge end portion adapted to project from the press, means defining an air supply inlet for said chamber within said bottom wall of said discharge end portion of said duct, an air blower having an outlet connected to said inlet, said inner end portion of said top wall having a cup receiving portion where the cups are successively deposited on said top wall, air directing means projecting upwardly from said top wall adjacent said cup receiving portion and defining an air outlet, said air directing means being positioned to direct a substantial flow of air longitudinally above said top wall for immediately moving each cup from said cup receiving portion and longitudinally along said top wall towards said discharge end portion, and said top wall having a plurality of longitudinally extending and upwardly projecting parallel spaced ribs to control frictional drag between the cups and said top wall of said duct especially when the cups carry a lubricating oil.

16. A conveyor as defined in claim 15 and including means defining at least one louvered opening within said top wall of said duct downstream of said air directing means for directing a flow of air upwardly from said chamber and towards said discharge end portion of said conveyor to provide for continuous longitudinal movement of each cup along said top wall.

17. A method of rapidly and dependably transferring a succession of metal cups through a tunnel defined between the bed of a mechanical press and the lower die shoe of a cup forming die set mounted on the press bed, comprising the steps of positioning within the tunnel on the press bed an elongated generally flat air conveyor including parallel spaced top and bottom walls defining therebetween an air receiving chamber having an inner end portion and an outer end portion, blowing air into the outer end portion of the chamber from a motor driven blower, directing a flow of air from the inner end portion of the chamber upwardly above the top wall and through an outlet adjacent a cup receiving zone on the top wall and then longitudinally above the top wall for quickly moving each cup from the cup receiving zone towards the outer end portion of the conveyor, and directing an additional flow of air upwardly from the chamber through a plurality of openings spaced longitudinally within the top wall from the outlet for continuing the transfer of each cup to the discharge end of the conveyor.

18. A method as defined in claim 17 and including the step of supporting each cup slightly above the plane of the top wall with longitudinally extending ribs projecting upwardly from the plane to control frictional drag between each cup and the top wall.

19. A method as defined in claim 17 wherein the outlet is formed with an area greater than the combined areas of all of said openings.

* * * * *